(12) United States Patent
Nelson et al.

(10) Patent No.: US 7,412,962 B1
(45) Date of Patent: Aug. 19, 2008

(54) ENGINE GRASS SCREEN ASSEMBLY

(75) Inventors: Dean M. Nelson, Waldo, WI (US); Gregory E. Schmitz, Sherwood, WI (US); Todd A. Baumann, Howards Grove, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 11/670,082

(22) Filed: Feb. 1, 2007

(51) Int. Cl.
*F02B 77/04* (2006.01)

(52) U.S. Cl. ............................. 123/198 E; 123/41.63; 55/437

(58) Field of Classification Search .............. 123/198 E, 123/195 C
See application file for complete search history.

(56) References Cited

U.S. PATENT DOCUMENTS

| | | | |
|---|---|---|---|
| 3,183,899 A | 5/1965 | Tuggle | |
| 3,252,449 A | 5/1966 | Couchman, Jr. et al. | |
| 4,233,040 A | 11/1980 | Vogelaar | |
| 5,046,458 A | 9/1991 | Kronich | |
| 5,285,751 A * | 2/1994 | Liegeois et al. | .......... 123/41.63 |
| 6,706,084 B2 | 3/2004 | Bayer et al. | |
| 6,726,734 B2 | 4/2004 | Bayer et al. | |
| 2006/0169256 A1 | 8/2006 | Lavender et al. | |
| 2007/0220847 A1 * | 9/2007 | Notaras et al. | .............. 55/385.3 |

FOREIGN PATENT DOCUMENTS

EP 0352794 A2 1/1990

* cited by examiner

*Primary Examiner*—Noah Kamen
(74) *Attorney, Agent, or Firm*—Whyte Hirschboeck Dudek SC

(57) ABSTRACT

A highly durable engine grass screen assembly is disclosed. The assembly includes a grass screen for covering an air intake port of the engine, a grass screen stiffening mechanism for supporting the grass screen, a washer mechanism for compressing the screen such that the screen is pre-stressed during manufacture and such that the screen remains in compression during engine operation. The assembly can include one or more stud mechanisms which are securable to either an engine flywheel assembly or an engine fan assembly. The washer mechanism, the grass screen and the grass screen stiffening mechanism are engaged in a secured fashion to one or more stud mechanisms. A method of assembling and positioning a grass screen assembly in an engine is also disclosed.

20 Claims, 3 Drawing Sheets

ENGINE GRASS SCREEN ASSEMBLY

FIELD OF THE INVENTION

The invention relates generally to internal combustion engines, and more particularly to engine grass screen assemblies that permit such engines to be used in environments where grass and other debris or foreign matter are present.

BACKGROUND OF THE INVENTION

Internal combustion engines used on agricultural equipment (e.g. mowers) are often exposed to air that contains large quantities of foreign matter. During the normal operation of such engines, a fan draws in air for combustion and/or cooling purposes through an opening in an engine housing, typically called a "blower housing". Engine grass screens are typically placed over the air intake opening to the engine fan to reduce the amount of foreign matter that passes through the engine fan in to the engine housing. The grass screens are typically designed to rotate along with the engine flywheel or cooling fan so that most of the debris can be shred and shed from the screen, thereby allowing air to flow freely through the engine fan.

Screens that rotate along with an engine flywheel or fan do so very rapidly at high rotational frequencies. Rotating screens are subject to substantial stresses caused by centrifugal forces and engine speed fluctuations during engine operation. In general, it is understood that the first resonant frequency of the screen should typically be more than about two and a half times (2.5×) the rotational frequency of the engine. Accordingly, and as one example, an engine having a running speed of 3600 rpm has a rotational frequency of 60 Hz. Thus, proper screen first resonant frequency of such an engine screen is preferably over 150 Hz (i.e., greater than 2.5 times 60 Hz).

An improved, more durable, engine grass screen assembly that both accommodates a compact engine size and maintains overall engine performance (e.g., power, efficiency, etc.) is desired.

BRIEF SUMMARY OF THE INVENTION

In accordance with at least one aspect of the invention, an engine grass screen assembly is disclosed. The assembly includes a grass screen for covering an air intake port of the engine, a grass screen stiffening mechanism for supporting the grass screen, and at least one washer mechanism for compressing the screen. The assembly can further include at least one stud mechanism that can be secured to at least one of an engine flywheel assembly and an engine fan assembly. The washer mechanism, the grass screen and the grass screen stiffening mechanism, are engaged in a secured fashion (e.g., via threaded screw-like connections, etc.) to the stud mechanism.

In another aspect, a method of assembling and positioning a grass screen assembly in an engine is disclosed.

Advantageously, the screen is compressed during assembly and/or manufacture and the screen remains in compression during engine operation, thereby increasing overall screen durability.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. Like reference numerals are used to indicate like components. In the drawings.

DETAILED DESCRIPTION OF THE PREFERRED EMBODIMENT(S)

Figure 1:
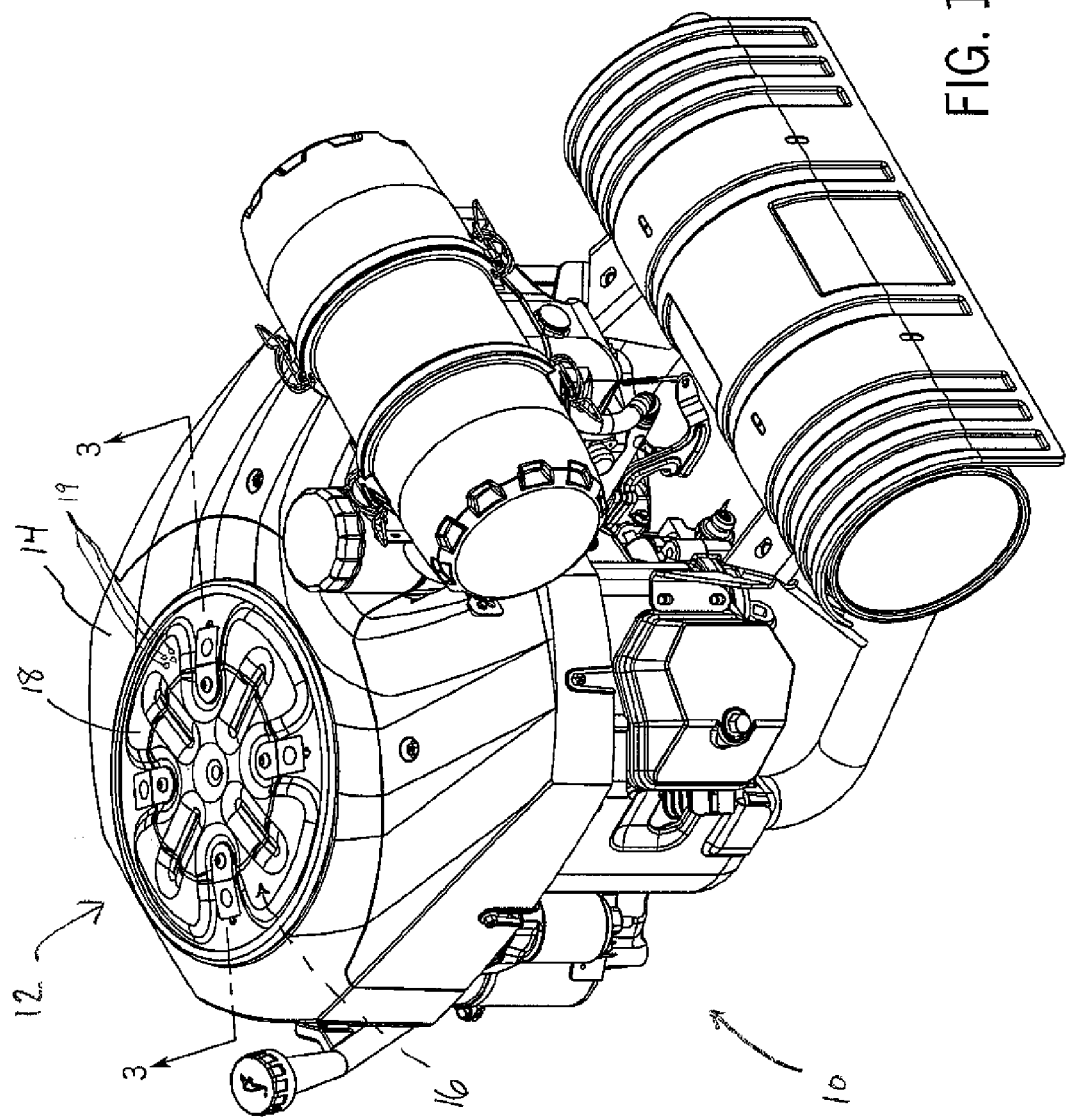
FIG. 1 is a perspective view of an internal combustion engine having an engine grass screen assembly in accordance with one aspect of the present invention.

FIG. 1 illustrates a perspective view of an internal combustion engine 10 having an engine grass screen assembly, referenced generally by the numeral 12, in accordance with one aspect of the present invention. The engine 10 further includes a blower housing 14 with an air intake port 16. The grass screen assembly 12 includes a grass screen 18 that covers the air intake port 16 of the engine 10. The screen 18 typically includes an array of holes 19 (shown in schematic fashion for simplicity) which permit air to pass through from the exterior of engine blower housing 14 to the air intake port 16. Advantageously, the array of holes 19 could serve to reduce the bending of the screen during engine operation. Various hole patterns or arrays, other than those illustrated, are contemplated and considered within the scope of the present invention. As will be described below with reference to FIG. 2, it is a hallmark of the present invention that the screen 18 is compressed or placed into compression during manufacture or assembly of the assembly 12, and further, the screen 18 remains, or at least substantially remains in compression during operation of the engine 10.

The engine 10 is a vertical shaft internal combustion engine that, as noted above, can be used on agricultural equipment, such as lawn mowers. One example of an engine suitable for use with the present invention is the Command PRO® engine, manufactured by Kohler Co., which is located in Kohler, Wis. The inventive grass screen assembly is illustrated and described with respect to a vertical shaft engine herein, however, it should be understood that the invention is applicable to other types of engines, including horizontal shaft internal combustion engines, with such variations contemplated and considered within the scope of the present invention.

Figure 2:
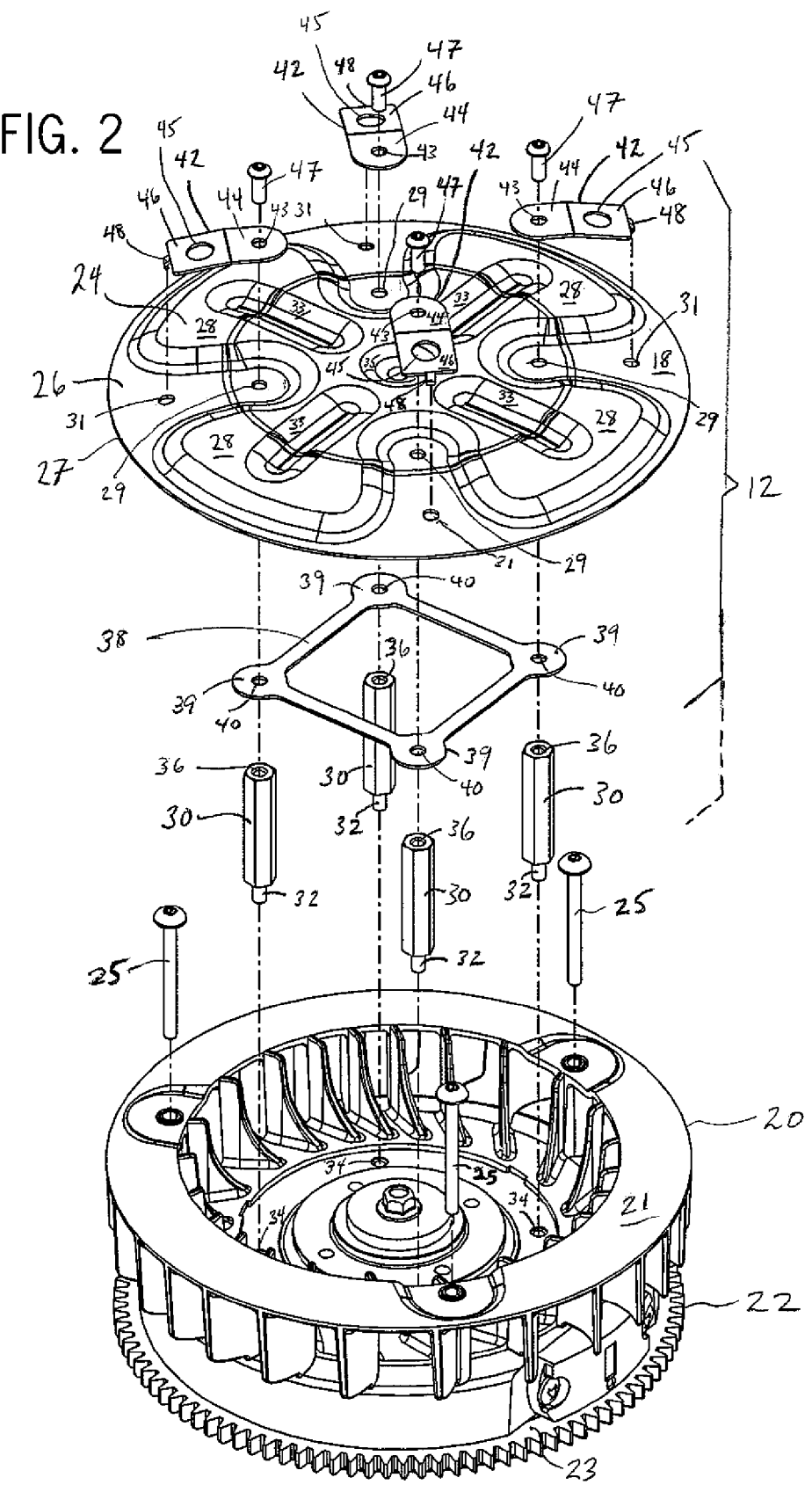
FIG. 2 is an exploded view of the engine grass screen assembly of FIG. 1, along with an engine fan assembly and flywheel assembly.

FIG. 2 is an exploded view of the engine grass screen assembly 12 (shown using a bracket) of FIG. 1, along with an engine fan assembly 20 and a flywheel assembly 22, in accordance with at least some embodiments of the present invention. The fan assembly 20 includes a cooling fan 21 for generating cooling airflow for the engine via rotational movement (e.g., in a clockwise or counterclockwise direction) and the flywheel assembly includes a flywheel 23. The flywheel assembly 22 and fan assembly 20 are connected via one or more screws 25 which pass through the fan assembly are secured (not shown) to flywheel assembly. Other connecting mechanisms (e.g., bolts, rivets, etc.) are contemplated and considered within the scope of the present invention.

The engine grass screen assembly 12 includes a screen 18 having a domed portion 24 and a peripheral portion 26 that surrounds, or at least substantially surrounds the domed portion and terminates in a peripheral edge 27. In a preferred embodiment, and as shown, the domed portion 24 of the grass screen 18 is contoured such that it is generally clover-shaped, and the clover-shaped domed portion includes plurality of leaf portions 28. As illustrated, and in accordance with a preferred embodiment of the invention, the domed portion 24 includes four leaf portions 28, and the peripheral portion 26 is contoured such that is surrounds (so that it extends between) each of the four leaf portions of the domed portion. The peripheral portion further includes a first plurality of fastening holes 29 and a second plurality of fastening holes 31 located between the plurality of leaf portions 28, and in accordance with a preferred embodiment, there are four of each such fastening holes. The grass screen 18 also comprises contoured recessed areas 33, as well as a central recessed area 35, each of which serve to provide rigidness and/or stiffening to the screen during engine operation. Contoured recessed regions location and shape can vary to convenience. While the number of contoured recessed regions can also vary, it has been found that the quantity will typically correlate to the number of leaf portions in the dome-shaped portion (e.g., where there are four leaf portions as shown, there are four contoured recessed regions included in the grass screen). The grass screen 18 can be constructed from any of a variety of materials, or a combination of materials, including by way of example, metals (e.g., steel, aluminum, etc.) and nonmetals (e.g., the screen can comprise a plastic molded part).

In accordance with at least some embodiments of the present invention, the grass screen assembly 12 further includes a plurality of stud or shaft-like mechanisms 30 (also called "grass screen studs"). As illustrated, and in accordance with a preferred embodiment of the invention, the plurality include four stud mechanisms 30 and each of the plurality of stud mechanisms is securable (e.g., via threaded engagement) to the engine flywheel assembly 22. More specifically, and in accordance with at least one preferred embodiment, stud mechanisms 30 include ends 32 that engage threaded holes 34 (three of which are shown) in the flywheel assembly 22. Each stud mechanism further includes a recessed threaded end 36 that will be described further below. As shown, each stud mechanism has a hexagonal shape, however, variations to this shape are contemplated and considered within the scope of the present invention.

In at least some embodiments, it is contemplated that the stud mechanisms can be considered as separate from the engine screen assembly 12 (i.e., that the engine screen assembly is connected to one of the fan assembly and the flywheel assembly via the stud mechanisms) and for this reason, the bracket associated with numeral 12 includes a dashed portion. It is also contemplated that, in at least some embodiments (not shown), the stud mechanisms can be designed and/or fabricated such that they can be secured or fastened to the engine fan assembly 20, and such embodiments are to be considered within the scope of the present invention.

The grass screen assembly 12 also includes, in accordance with at least some embodiments, a grass screen stiffening mechanism 38 for supporting the grass screen. As shown, and in accordance with a preferred embodiment, the stiffening mechanism 38 is generally rectangular in shape and includes a plurality of rounded corner portions 39 (as shown there are four such portions) including holes 40 formed therein. As illustrated and in accordance with at least one preferred embodiment, the stiffening mechanism 38 is positioned generally between the grass screen 18 and the plurality of stud mechanisms 30. The stiffening mechanism and other grass screen assembly mechanisms are typically constructed of steel, although other materials (e.g., aluminum) are contemplated and considered within the scope of the present invention.

The grass screen assembly further includes a plurality of plate-like washer mechanisms 42. As shown and in accordance with at least one preferred embodiment, there are four such washer mechanisms. As shown, each of the plurality of washer mechanisms includes a rounded portion 44 and a rectangular portion 46 bent with respect to the rounded portion, and the rectangular portion includes a device 48 for engaging the grass screen 18 to ensure proper orientation of the washer mechanism during assembly. As shown, and in accordance with at least one embodiment of the invention, the device 48 comprises a tang mechanism for engaging the grass screen 18 in hole 31. Further, the rounded portions 44 have holes 43 and the rectangular portions 46 include holes 45. Holes 43 facilitate assembly of the grass screen assembly 12 and holes 45 facilitate air flow during rotation of the grass screen 18. As noted below, and significantly, the washer mechanisms 42 serve to compress the screen 18 such that the screen remains in compression during engine operation.

In accordance with at least one preferred embodiment, and still referring to FIG. 2, each of the plurality of washer mechanisms 42 are secured, as shown, to the peripheral portion 26. More specifically, the washer mechanisms 42 are connected to the peripheral portion between the plurality of leaf portions 28. In general, and in accordance with at least one aspect of the present invention, the number of washer mechanisms 42 correspond to the number of leaf portions 28 of the domed portion 24 (e.g., as shown, there are four plate mechanisms and four leaf portions).

The grass screen assembly 12 further comprises, in at least some embodiments, a plurality of connecting mechanisms 47 for securably engaging the plurality of washer mechanisms 42, the grass screen 18 and the grass screen stiffening mechanism 38 to the plurality of stud mechanisms 30, and such engagement is described below. As noted above with respect to the contoured recessed portions 33, the number and location of the connecting mechanisms can be varied, but typically correlates to the number of leaf portions of the domed portion. It is further noted that, while the precise size and geometry of the grass screen stiffening mechanism 38 can vary, these factors typically correlate with the number and placement of the connecting mechanisms. For example, as shown, there are four connecting mechanisms 47 spaced in equidistant fashion circumferentially about the grass screen 18 and the rectangular shape of the grass screen stiffening mechanism accommodates each of the connecting mechanisms via holes 40 in its rounded corner portions 39.

Assembly/Operation

With reference to FIG. 2, and in accordance with at least one aspect of the present invention, the above-described grass screen assembly 12 can be assembled and positioned with respect to a flywheel assembly or fan assembly in the following manner. First, the plurality of stud mechanisms 30 can be secured to either the engine flywheel assembly 22 or the engine fan assembly 20. Next, the grass screen 18 for covering an air intake port of the engine, a grass screen stiffening mechanism 38 for providing an additional stiffness to the grass screen, and a plurality of washer mechanisms 42 for compressing the screen are provided. Finally, the grass screen 18, the grass screen stiffening mechanism 38, and the plurality of washer mechanisms 42 can be connected to at least one of the plurality of stud mechanisms 30, with the washer mechanisms compressing, so as to pre-stress, the grass screen 18 such that the screen will remain in compression during engine operation.

In accordance with at least some embodiments of the invention, the securing step can be accomplished by threadably engaging one end, as shown end 32, of each of the plurality of stud mechanisms 30 with either the engine flywheel assembly 22 (as shown via holes 34), or alternatively, the engine fan assembly (not shown). Further, and in accordance with at least one embodiment of the present invention, the connecting can be accomplished by threadably engaging a plurality of connecting mechanisms 47 (e.g., screws) with the plurality of stud mechanisms 30, for example and as shown, at threaded receiving ends 31 of the stud mechanisms.

Additionally, and in accordance with another aspect of the present invention, the method can include aligning the grass screen 18, the grass screen stiffening mechanism 38 and at least one of the plurality of washer mechanisms 42 in overlay relationship with respect to each other. In this fashion, the connecting mechanisms 47 can be passed through holes 43, 29, and 40 in the washer plates 42, grass screen 18 through holes 31, and stiffening mechanism 38, respectively, with the connecting mechanisms, as previously described, threadably engaging the plurality of stud mechanisms 30 so as to assembly the grass screen assembly and position the assembly within the engine with respect to the flywheel assembly (or fan assembly as the case may be).

As shown, and in accordance with at least some embodiments of the present invention, the connecting device 48 (e.g., a tang) of at least one of the washer mechanisms 42 is engaged or otherwise secured the grass screen 18 prior to the connecting (i.e., via the connecting mechanisms 47) of the washer mechanisms to the grass screen 18 to the stud mechanisms 30 as described above. And in accordance with yet another embodiment, each of the connecting devices (e.g., tangs) can be engaged to the grass screen 18 prior to the connecting taking place.

Additionally, and as noted above, the domed portion 24 of the screen 18 can be clover-shaped and include a plurality of leaf portions 28, with the plurality of washer mechanisms 42 connected to the peripheral portion 26 of the screen between the plurality of leaf portions. More specifically, in accordance with at least some embodiments of the invention (and as illustrated), the assembly 12 can comprise four washer mechanisms 42, and the clover-shaped domed portion 24 can include four leaf portions. Further, each of the four washer mechanisms can be secured, as shown, to the peripheral portion, respectively, between each of the four leaf portions.

Figure 3:
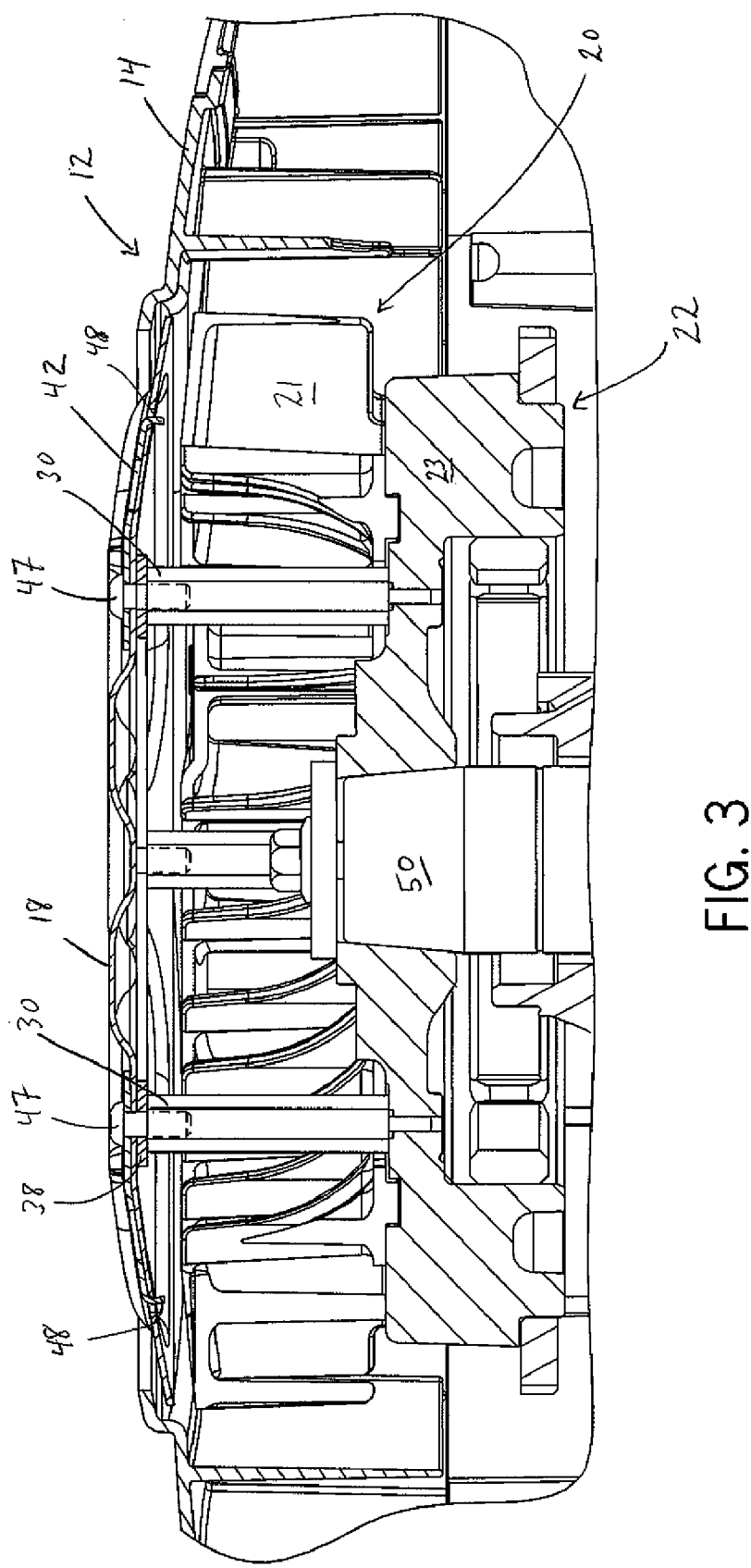
FIG. 3 is a cross-sectional view taken along line 3-3 of FIG. 1 showing the engine grass screen assembly in operative association with the fan assembly and the flywheel assembly.

Turning to FIG. 3, a cross-sectional view taken along line 3-3 of FIG. 1 showing the assembled engine grass screen assembly 12 connected to and in operative association with the fan assembly 20 and the flywheel assembly 22. The fan assembly includes a cooling fan 21 and the flywheel assembly 22 includes a flywheel 23. Stud mechanisms 30 are shown to be mounted on the flywheel 23. In this manner, as the flywheel 23 rotates via crankshaft 50 during engine operation, the grass screen 12 also rotates. Again, in alternative embodiments, it is contemplated that the stud mechanisms 42 may be mounted to the fan assembly. When the engine is running, the fan 21 rotates to suck air into the blower housing 14 through and around the rotating screen 12. It is noted that screen rotation helps to prevent debris from accumulating on the outside surface of the screen 12 while the engine is running and cooling air is being sucked through and around the rotating screen.

As noted above, the grass screen assembly 12 further includes grass screen stiffening mechanism 38. As shown, in accordance with at least some embodiments of the invention, the grass screen stiffening mechanism 38 is positioned below or beneath the grass screen 18, and more specifically, the grass screen stiffening mechanism is positioned so that it lies between the fan 21 and the grass screen on a side of the grass screen closest to the crankshaft. The grass screen assembly further includes the plurality of washer mechanisms 42 and, as shown, the washer mechanisms 42 include connecting devices 48 which are used to connect each washer mechanism to the grass screen 18 during assembly. Finally, the grass screen assembly 12 includes connecting mechanisms 47 (e.g., screws) that serve to couple the grass screen 18, the washer mechanisms and the grass screen stiffening mechanism 38 to the stud mechanisms 30 as already described.

Advantageously, during assembly of the grass screen assembly 12, the screen is "pre-stressed" by tightening the washer mechanisms 42, thereby transmitting pressure to the screen 12, as shown in a downward direction toward the crankshaft. Pre-stressing increases screen durability. For example, in tests without pre-stressing the screen, cracking of the screen was observed after less than 100 hours of testing during engine operation, whereas with pre-stressing the screen, cracking of the screen was not observed at less than 1000 hours of testing during engine operation. Importantly, and as noted above, the frequency generated by the screen during engine operation should typically be more than 2.5 times the frequency generated by the engine during operation. In general, the screen size, its dimensions, shape, materials, and the like can vary to convenience provided that durability and other design factors are taken into account.

As shown and described with respect to the FIGS., there are four leaf portions 28 of the domed portion 24, as well as four washer mechanisms 42, four connecting mechanisms 47 and so on. Other combinations are possible and considered within the scope of the present invention, provided that the desired or proper frequency (i.e., greater than 2.5 times the engine frequency) is achieved by the grass screen during operation of the engine. For example, in accordance with at least some embodiments, it is contemplated that the "clover" shaped domed portion can be replaced by a simple dome-shaped portion that is surrounded by peripheral portion. In other embodiments, the plurality of leaf portions can comprise any number of leaf portions. It is further contemplated that, in at least one embodiment, the washer mechanisms 42 may be integrally joined (e.g., via welding) to the grass screen 12. It is still further contemplated that, in at least some embodiments, the washer mechanisms 42 and the grass screen stiffening mechanism 38 can be combined into a single component.

Again, many other variations to the grass screen assembly, its components, and the engine in which it is utilized are possible and considered within the scope of the claims. It is specifically intended that the present invention not be limited to the embodiments and illustrations contained herein, but include modified forms of those embodiments including portions of the embodiments and combinations of elements of different embodiments as come within the scope of the following claims.

We claim:

1. A grass screen assembly for use with an engine, the assembly comprising:
   a stud mechanism securable to at least one of an engine flywheel assembly or an engine fan assembly;
   a grass screen for covering an air intake port of the engine, the grass screen connected to the stud mechanism;
   a grass screen stiffening mechanism for supporting the grass screen, the grass screen stiffening mechanism connected to the stud mechanism; and
   a washer mechanism connected to or formed as an integral part of the grass screen, the washer mechanism for compressing the screen such that the screen remains in compression during engine operation.

2. The assembly of claim 1 further comprising a connecting mechanism for securably engaging the washer mechanism, the grass screen and the grass screen stiffening mechanism to the stud mechanism.

3. The assembly of claim 1 wherein the grass screen includes a domed portion, a peripheral portion that substantially surrounds the domed portion and terminates in a peripheral screen edge, and wherein an array of holes is formed in at least one of the domed and peripheral portions.

4. The assembly of claim 1 wherein the grass screen includes a recessed area for providing stiffness to the screen.

5. The assembly of claim 1 wherein the washer mechanism is connected to the grass screen and wherein the washer mechanism includes a rounded portion and a rectangular portion bent with respect to the first rounded portion.

6. The assembly of claim 5 wherein the rectangular portion includes a device for engaging the grass screen.

7. The assembly of claim 6 wherein the device is a tang mechanism.

8. The assembly of claim 1 wherein the grass screen includes a domed portion and a peripheral portion that substantially surrounds the domed portion and terminates in a peripheral screen edge, and wherein the washer mechanism is connected to the peripheral portion.

9. The assembly of claim 1 wherein the at least one of the plurality of washer mechanisms includes a rounded portion and a rectangular portion bent with respect to the first rounded portion, wherein the rectangular portion includes a device for engaging the grass screen.

10. The assembly of claim 9 wherein the device for engaging the grass screen is a tang mechanism.

11. An engine grass screen assembly comprising:
a plurality of stud mechanisms each of which are securable to either an engine flywheel assembly or an engine fan assembly;
a grass screen, the grass screen for covering an air intake port of the engine and including a domed portion, a peripheral portion that substantially surrounds the domed portion, and an array of holes that is formed in at least one of the domed and peripheral portions;
a grass screen stiffening mechanism for supporting the grass screen;
a plurality of washer mechanisms for compressing the screen such that the screen remains in compression during engine operation; and
a plurality of connecting mechanisms for securably engaging the plurality of washer mechanisms, the grass screen and the grass screen stiffening mechanism to the plurality of stud mechanisms.

12. The assembly of claim 11 wherein the domed portion is clover-shaped and includes a plurality of leaf portions and the plurality of washer mechanisms are connected to the peripheral portion of the screen between the plurality of leaf portions.

13. The assembly of claim 12 wherein the assembly comprises four washer mechanisms, wherein the clover-shaped domed portion includes four leaf portions, and each of the four washer mechanisms are secured to the peripheral portion, respectively, between each of the four leaf portions.

14. The assembly of claim 13 wherein the assembly includes four stud mechanisms and four connecting mechanisms, and wherein the stiffening mechanism is generally rectangular and positioned generally between the grass screen and the four stud mechanisms.

15. The assembly of claim 11 wherein the grass screen includes a plurality of recessed areas for providing stiffness to the screen.

16. A method of assembling and positioning a grass screen assembly in an engine having at least one of a fan assembly and a flywheel assembly, the method comprising:
securing a plurality of stud mechanisms to either the engine flywheel assembly or the engine fan assembly;
providing a grass screen assembly, the grass screen assembly including a grass screen for covering an air intake port of the engine, a grass screen stiffening mechanism for providing an additional stiffness to the grass screen; and a plurality of washer mechanisms for compressing the screen; and
connecting the grass screen, the grass screen stiffening mechanism, and the plurality of washer mechanisms of the grass screen assembly to at least one of the plurality of stud mechanisms so as to pre-stress the grass screen using at least one of the plurality of washer mechanisms, such that the screen remains in compression during engine operation.

17. The method of claim 16 wherein the securing is accomplished by threadably engaging at least one of the plurality of stud mechanisms with either the engine flywheel assembly or the engine fan assembly.

18. The method of claim 17 wherein the connecting is accomplished by threadably engaging at least one of a plurality of connecting mechanisms with at least one of the plurality of stud mechanisms.

19. The method of claim 18 further comprising aligning the grass screen, the grass screen stiffening mechanism and at least one of the plurality of washer mechanisms of the grass assembly in overlay relationship with respect to each other.

20. An engine grass screen assembly comprising: a grass screen, the grass screen for covering an air intake port of an engine, a grass screen stiffening mechanism for supporting the grass screen, and a washer mechanism for compressing the screen such that the screen is pre-stressed during manufacture and such that the screen remains in compression during engine operation; wherein the washer mechanism, the grass screen and the grass screen stiffening mechanism are securably engaged to at least one of a flywheel and a fan assembly.

* * * * *